United States Patent Office 3,438,932
Patented Apr. 15, 1969

3,438,932
HIGH STRENGTH, HEAT RESISTANT FLUOROELASTOMERS
Jerry K. Sieron, Dayton, Ohio, assignor to the United States of America as represented by the Secretary of the Air Force
No Drawing. Filed Dec. 9, 1966, Ser. No. 600,669
Int. Cl. C08f 29/16, 45/04
U.S. Cl. 260—41                 2 Claims

ABSTRACT OF THE DISCLOSURE

This invention encompasses reinforced fluoroelastomer materials suitable for seals, O-rings, clamping devices, etc., which have high tensile strength, high tear, high heat resistance, good compression set and utility at 700° F. for reasonable time periods. In particular the invention concerns a vinylidene fluoride-perfluoroethylene copolymer vulcanizate containing acicular-platy talc as a reinforcing material.

---

The invention described herein may be manufactured and used by or for the United States Government for governmental purposes without the payment to me of any royalty thereon.

This invention deals with elastomeric materials suitable for seals, O-rings, tires, clamping devices, and the like, said materials having high tensile strength, high tear strength, high heat resistance, good compression set, and being suitable for use at temperatures as high as 700° F. for reasonable time periods. More particularly, the invention deals with a fluoroelastomer vulcanizate reinforced with the acicular-platy form of magnesium silicate.

Subsystem components of advanced aerospace systems are being subjected to ever increasing environmental requirements. Notwithstanding any advance in this art to date, considerable advantage will be gained by the discovery of higher strength and higher heat resistant elastomer compositions for use in tires, seals, hoses, clamping devices, and the like. Research to date in this art has involved the study of reinforcement, stabilization, and improved cross linking of fluoroelastomers and other polymers.

It was found, for example, that the use of compositions comprising hydrocarbon elastomers reinforced with fine particle size, high structure carbon black was a decided advance in the art. Also, the use of stannous oxide as a stabilizer for phenolic resin cured butyl elastomers provided a composition effective up to temperatures of 500° F. Further, butyl-ethylene-propylene terpolymer vulcanization-stabilization systems have been developed which extend, 3-fold, the useful life of the terpolymer at temperatures in the range 300°–500° F. Another noteworthy advance in the art resulted from the use of fluoroelastomers reinforced with carbon fibers. The latter composition has good high temperature tensile strength and improved life at temperatures up to 600° F.

OBJECTS

It is an object of my invention to provide improved high strength, high heat resistant fluoroelastomer compositions with good compression strength.

It is a further object to provide such compositions wherein a unique reinforcing agent imparts improved tensile strength, improved hot tear strength, and improved resistance to deterioration in the temperature range 600–700° F.

I have now found that the foregoing and related objects can be attained with a composition comprising a fluoroelastomer reinforced with acicular-platy (A-P) magnesium silicate which is a particular form of mineral talc.

My novel compositions are mixed and molded (or otherwise formed) by the methods commonly practiced in the art. I generally mix a fluoroelastomer with a filler such as magnesium oxide, the reinforcing agent of the invention, and a vulcanizing agent such as an alicyclic amine salt or benzoyl peroxide. The composition may then be molded into an O-ring, for example. The product is commonly press-cured at about 330° F. for 30 minutes and is then post-cured by raising the temperature to 400° F. over a period of 4 hours and holding at 400° F. for 24 hours.

Any fluoroelastomer may be used in the composition; e.g., polymers and copolymers of vinylidene fluoride, perfluoropropylene, chlorotrifluoroethylene, and the like.

Asbestos, also a fibrous form of magnesium silicate, has been used as a reinforcing agent for fluoroelastomers and it produces a good tensile strength product. However, the use of asbestos leads to severe degradation when the vulcanizates are subjected to aging at 600° F. Various forms of carbon such as MT Black and fibrous carbon (for example, as sold under the trade name Carbon Wool), have been used with some success and these materials have been used as controls in evaluating the value of acicular platy magnesium silicate as a reinforcing agent (see Tables 1, 2, 3, and 6).

The acicular-platy magnesium silicate can be used over a wide range of concentrations relative to the fluoroelastomer. However, I recommend that 10–50 parts, and preferably about 30–40 parts, of reinforcing agent per 100 parts elastomer be used (see Table 4).

The compositions of the invention have good compression set (generally about 40 percent) and have a 400° F. tensile strength which is 80 percent greater than that attainable with the commonly used thermal carbon black reinforcing. When hot tear strengths are compared, my novel compositions show up even better. In addition to the value of these properties in seals, gaskets, flexible connectors, coated fabrics, and the like; I have found the compositions to be especially suitable for dynamic seals, such as rotating rod seals, because fibrous talc of the acicular-platy type is inherently non-abrasive, thus imparting low wear characteristics to seals.

EXAMPLE

A number of elastomer compositions were prepared. These comprised the copolymer of vinylidene fluoride and perfluoropropylene (100 parts by weight), and alicyclic amine salt curing agent (2 parts), magnesium oxide (15 parts), and a reinforcing agent. Table 1 shows the formula used. The formula used in the tests reported in Tables 2–6, inclusive, is the same except that the reinforcing agent is changed as indicated in each table.

Table 1 shows the comparison between MT carbon black and acicular-platy magnesium silicate (referred to as A-P talc).

Table 2 shows a comparison among 3 types of magnesium silicate-asbestos, powdered, and the acicular-platy form.

Table 3 shows the comparative effect of 600° F. aging on compositions containing MT Black, Carbon Wool, and acicular-platy magnesium silicate.

Table 4 shows the effect of varying the concentration of the reinforcing agent of the invention.

Table 5 shows the comparative effect of 700° F. aging on compositions containing MT Black, Carbon Wool, and talc.

Table 6 shows the comparative tear strength of compositions aged at 400° F.

It is to be understood that the foregoing example and description are for the purposes of illustration only, and that various changes may be made therein without departing from the spirit and scope of the invention.

TABLE 1

[Press-cure: 30 min./330° F.; Post-cure: 4 hrs. rise to 400° F.+24 hrs./400° F.]

| Formula | Control | A-P Talc |
|---|---|---|
| Elastomer | 100 | 100 |
| Magnesium Oxide | 15 | 15 |
| Medium Thermal Carbon Black | 30 | ---- |
| A-P Talc | ---- | 20 |
| Alicyclic amine salt | 2 | 2 |
| PHYSICAL PROPERTIES—Original at 75° F.: | | |
| Tensile Strength p.s.i | 2,460 | 2,400 |
| Elongation, percent | 275 | 240 |
| Hardness, Shore A | 75 | 75 |
| Original at 400° F.: | | |
| Tensile Strength, p.s.i | 340 | 610 |
| Elongation, percent | 105 | 110 |
| Aged 72 hrs./600° F., tested at 75° F.: | | |
| Tensile Strength, p.s.i | [1] 490 | 1,220 |
| Elongation, percent | 80 | 80 |
| Hardness, Shore A | 90 | 87 |
| Aged 16 hrs./600° F.+4 hrs./700° F., tested at 75° F.: | | |
| Tensile Strength, p.s.i | [2] 490 | 840 |
| Elongation, percent | 155 | 150 |
| Hardness, Shore A | 78 | 80 |
| Tear Strength, lb./inch: | | |
| At 75° F | 131 | 220 |
| At 400° F | 24 | 38 |

[1] Sample broke when bent 180°.
[2] Sample appeared to be reverted.

TABLE 2

| | Fibrous Talc | Reinforcing Agent | |
|---|---|---|---|
| | | A-P Talc | Powdered |
| Original at 75° F.: | | | |
| Tensile Strength, p.s.i | 2,150 | 2,400 | 1,800 |
| Elongation, percent | 320 | 240 | 295 |
| Hardness, Shore A, parts | 76 | 75 | 66 |
| Original at 400° F.: | | | |
| Tensile Strength, p.s.i | 320 | 610 | 330 |
| Elongation, percent | 110 | 110 | 170 |
| Aged 16 hrs at 600° F., Tested at 75° F.: | | | |
| Tensile Strength, p.s.i | 1,720 | 1,720 | 1,660 |
| Elongation, percent | 185 | 195 | 250 |
| Hardness, Shore A, parts | 78 | 79 | 75 |
| Aged 72 hrs/600° F., Tested at 75° F.: | | | |
| Tensile Strength, p.s.i | 1,270 | 1,220 | 1,070 |
| Elongation, percent | 120 | 90 | 130 |
| Hardness, Shore A, parts | 90 | 87 | 85 |
| Aged 72 hrs/600° F., Tested at 400° F.: | | | |
| Tensile Strength, p.s.i | 170 | 370 | ([1]) |
| Elongation, percent | 100 | 70 | ([1]) |

[1] Could not test, stock too weak.

TABLE 3

| | Reinforcing Agent | | |
|---|---|---|---|
| | Mt. Black | Carbon Wool | A-P Talc |
| Original at 75° F.: | | | |
| Tensile Strength, p.s.i | 2,460 | 1,980 | 2,400 |
| Elongation, percent | 275 | 195 | 240 |
| Hardness, Shore A, parts | 75 | 78 | 75 |
| Original at 400° F.: | | | |
| Tensile Strength, p.s.i | 340 | 590 | 610 |
| Elongation, percent | 105 | 100 | 110 |
| Aged 24 hr./600° F., Tested at 75° F.: | | | |
| Tensile Strength, p.s.i | 1,030 | 1,490 | 1,980 |
| Elongation, percent | 210 | 135 | 150 |
| Hardness, Shore A, parts | 80 | 82 | 82 |
| Aged 48 hr./600° F., Tested at 75° F.: | | | |
| Tensile Strength, p.s.i | 750 | 1,170 | 1,720 |
| Elongation, percent | 150 | 110 | 125 |
| Hardness, Shore A, parts | 81 | 84 | 86 |
| Aged 72 hr./600° F., Tested at 75° F.: | | | |
| Tensile Strength, p.s.i | [1] 490 | 1,130 | 1,220 |
| Elongation, percent | 80 | 120 | 80 |
| Hardness, Shore A, parts | 90 | 88 | 87 |
| Aged 96 hr./600° F., Tested at 75° F.: | | | |
| Tensile Strength, p.s.i | [1] 970 | 1,210 | 1,540 |
| Elongation, percent | 30 | 115 | 45 |
| Hardness, Shore A, parts | 98 | 91 | 95 |
| Aged 140 hr./600° F., Tested at 75° F.: | | | |
| Tensile Strength, p.s.i | ([2]) | 630 | 1,900 |
| Elongation, percent | ([2]) | 40 | 20 |
| Hardness, Shore A, parts | ([2]) | 95 | 98 |

[1] Broken when bent 180°.
[2] Brittle, no test.

TABLE 4

| | Parts of A-P Talc per 100 Parts Elastomer | | | | | |
|---|---|---|---|---|---|---|
| | 0 | 10 | 20 | 30 | 40 | 50 |
| Original at 75° F.: | | | | | | |
| Tensile Strength, p.s.i | 2,850 | 2,540 | 2,280 | 2,400 | 3,000 | 2,600 |
| Elongation, percent | 520 | 315 | 260 | 240 | 190 | 115 |
| Hardness, Shore A, parts | 55 | 66 | 71 | 75 | 80 | 84 |
| Original at 400° F.: | | | | | | |
| Tensile Strength, p.s.i | 130 | 380 | 460 | 610 | 700 | 610 |
| Elongation, percent | 115 | 100 | 100 | 110 | 90 | 75 |
| Aged 16 hr./600° F., Tested at 75° F.: | | | | | | |
| Tensile Strength, p.s.i | 1,540 | 1,640 | 1,800 | 1,720 | 2,150 | 1,960 |
| Elongation, percent | 290 | 240 | 215 | 195 | 130 | 95 |
| Hardness, Shore A, parts | 60 | 70 | 75 | 79 | 84 | 87 |
| Aged 72 hr./600° F., Tested at 75° F.: | | | | | | |
| Tensile Strength, p.s.i | 1,120 | 940 | 1,030 | 1,220 | 1,140 | 1,260 |
| Elongation, percent | 145 | 95 | 85 | 80 | 50 | 35 |
| Hardness, Shore A, parts | 70 | 81 | 82 | 87 | 90 | 95 |

TABLE 5

| | Reinforcing Agent | | |
|---|---|---|---|
| | Mt. Black | Carbon Wool | A-P Talc |
| Original at 75° F.: | | | |
| Tensile Strength, p.s.i | 2,460 | 1,980 | 2,400 |
| Elongation, percent | 275 | 195 | 240 |
| Hardness, Shore A, parts | 78 | 78 | 75 |
| Aged 16 hr./600° F., Tested at 75° F.: | | | |
| Tensile Strength, p.s.i | 1,080 | 1,250 | 1,720 |
| Elongation, percent | 250 | 165 | 195 |
| Hardness, Shore A, parts | 75 | 80 | 75 |
| Aged 2 hr./700° F., Tested at 75° F.: | | | |
| Tensile Strength, p.s.i | 680 | 670 | 980 |
| Elongation, percent | 250 | 165 | 165 |
| Hardness, Shore A, parts | 72 | 73 | 80 |
| Aged 4 hr./700° F., Tested at 75° F.: | | | |
| Tensile Strength, p.s.i | [1] 490 | 450 | 840 |
| Elongation, percent | 155 | 125 | 150 |
| Hardness, Shore A, parts | 78 | 80 | 80 |
| Aged 8 hr./700° F., Tested at 75° F.: | | | |
| Tensile Strength, p.s.i | [1] 360 | 350 | [2] 780 |
| Elongation, percent | 85 | 85 | 60 |
| Hardness, Shore A, parts | 84 | 84 | 84 |

[1] Sample appeared to be reverted, broke when bent 180°.
[2] A smooth crust formed on the surface of the sample.

TABLE 6

| | Reinforcing Agent | | |
|---|---|---|---|
| | Mt. Black | Carbon Wool | A-P Talc |
| Tear Strength, lb./in.: | | | |
| 75° F | 131 | 202 | 220 |
| 400° F | 24 | 36 | 38 |

I claim:
1. A reinforced fluoroelastomer of the following composition:

| Component: | Parts by weight |
|---|---|
| Vinylidene fluoride-perfluoroethylene copolymer | 100 |
| Acicular-platy talc | 10–50 |
| Magnesium oxide | 15 |
| Alicyclic amine salt | 2 |

2. A reinforced fluoroelastomer of the following composition:

| Component: | Parts by weight |
|---|---|
| Vinylidene fluoride-perfluoroethylene copolymer | 100 |
| Acicular-platy talc | 30–40 |
| Magnesium oxide | 15 |
| Alicyclic amine salt | 2 |

References Cited
UNITED STATES PATENTS

| | | | |
|---|---|---|---|
| 3,105,827 | 10/1963 | Kaufman | 260—41 |
| 3,157,614 | 11/1964 | Fischer | 260—41 |
| 3,308,090 | 3/1967 | Falcone et al. | 260—41 |
| 3,334,063 | 8/1967 | Berliner | 260—41 |

OTHER REFERENCES

Chem. Abstracts, vol. 60, 5718h, March 1964.

ALLAN LIEBERMAN, *Primary Examiner.*